United States Patent
Ito et al.

(10) Patent No.: US 9,950,430 B1
(45) Date of Patent: Apr. 24, 2018

(54) ENCODER UPDATE BY USING REGENERATIVE POWER

(71) Applicant: Schaft Inc., Tokyo (JP)

(72) Inventors: Nobuyuki Ito, Tokyo (JP); Junichi Urata, Tokyo (JP); Koichi Nishiwaki, Tokyo (JP)

(73) Assignee: Schaft Inc., Tokyo (JP)

( * ) Notice: Subject to any disclaimer, the term of this patent is extended or adjusted under 35 U.S.C. 154(b) by 0 days.

(21) Appl. No.: 15/370,312

(22) Filed: Dec. 6, 2016

Related U.S. Application Data

(63) Continuation of application No. 14/989,898, filed on Jan. 7, 2016, now Pat. No. 9,555,547, which is a continuation of application No. 14/488,533, filed on Sep. 17, 2014, now Pat. No. 9,261,893.

(51) Int. Cl.
    *G05B 15/00*    (2006.01)
    *G06F 19/00*    (2018.01)
    *B25J 9/16*     (2006.01)

(52) U.S. Cl.
    CPC ............ *B25J 9/1694* (2013.01); *Y10S 901/46* (2013.01)

(58) Field of Classification Search
    None
    See application file for complete search history.

(56) References Cited

U.S. PATENT DOCUMENTS

| | | | |
|---|---|---|---|
| 4,079,251 A | 3/1978 | Osann | |
| 4,672,279 A | 6/1987 | Hosokawa | |
| 4,914,437 A | 4/1990 | Kibrick | |
| 4,920,259 A | 4/1990 | Epstein | |
| 4,922,176 A | 5/1990 | Kim | |
| 5,929,789 A | 7/1999 | Barbehenn | |
| 7,012,677 B2 | 3/2006 | Mutschler | |
| 7,022,975 B2 | 4/2006 | Horton | |
| 7,089,678 B2 | 8/2006 | Novak | |
| 7,091,473 B2 | 8/2006 | Rodi | |
| 7,118,601 B2 | 10/2006 | Yasui | |
| 7,321,113 B2 | 1/2008 | Hare | |

FOREIGN PATENT DOCUMENTS

| | | |
|---|---|---|
| EP | 0361867 | 4/1990 |
| WO | 199740345 | 10/1997 |

*Primary Examiner* — Bhavesh V Amin
(74) *Attorney, Agent, or Firm* — Honigman Miller Schwartz and Cohn LLP

(57) ABSTRACT

A robotic system may include an incremental encoder coupled to a joint of the system. The robotic system may include a memory configured to store representations of angular positions of the joint. The robotic system may include a motor coupled to the joint, where rotation of the joint while the motor is powered off (i) causes rotation of the motor such that electric power is generated, and (ii) updates the angular position of the joint. The robotic system may use the electric power to power on the incremental encoder and the memory while the robotic system is powered off. One or more processors may obtain, when the robotic system powers on after being powered off, the updated angular position of the joint from the memory, where the incremental encoder provides the updated angular position to the memory while the robotic system is powered off.

19 Claims, 11 Drawing Sheets

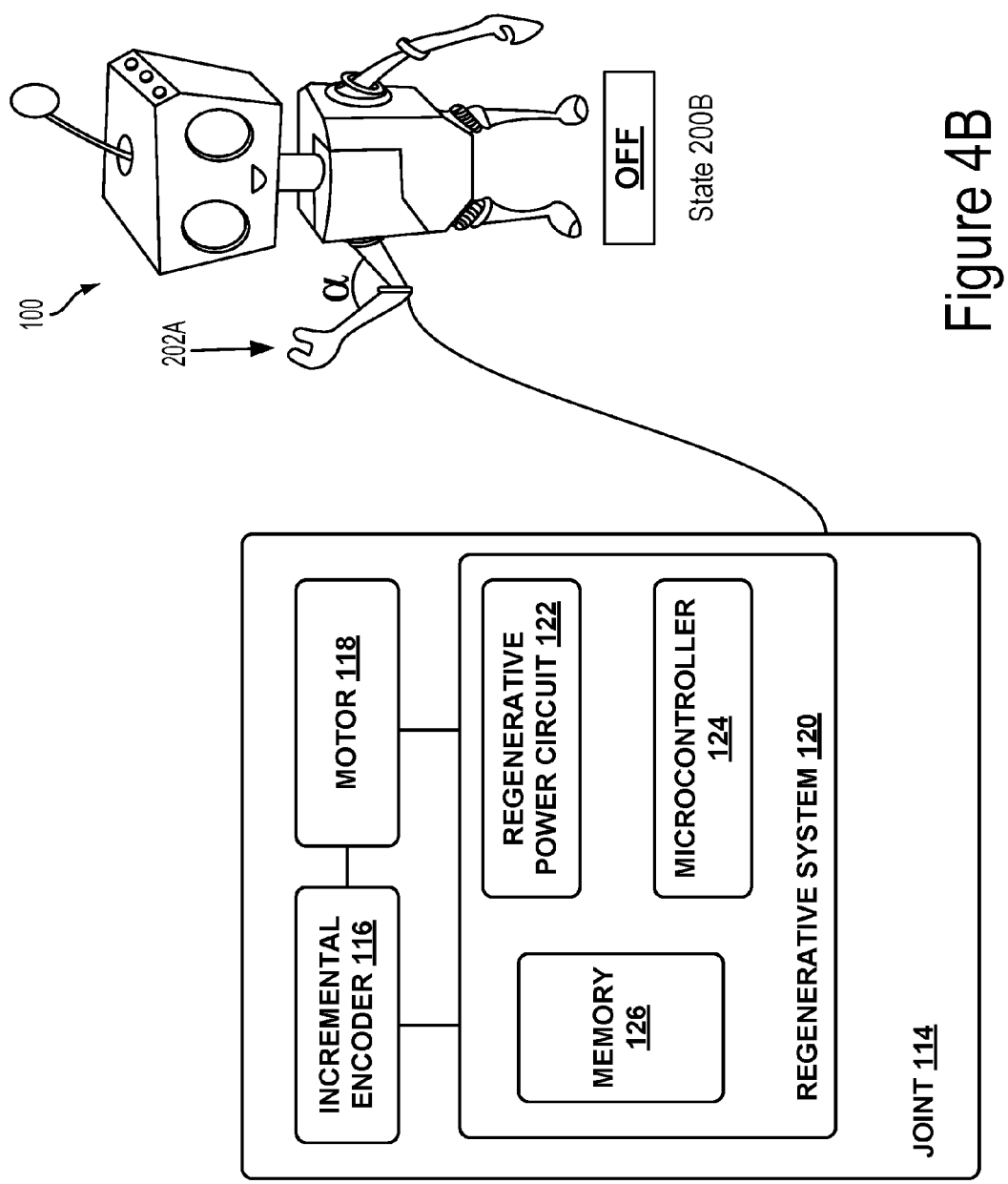

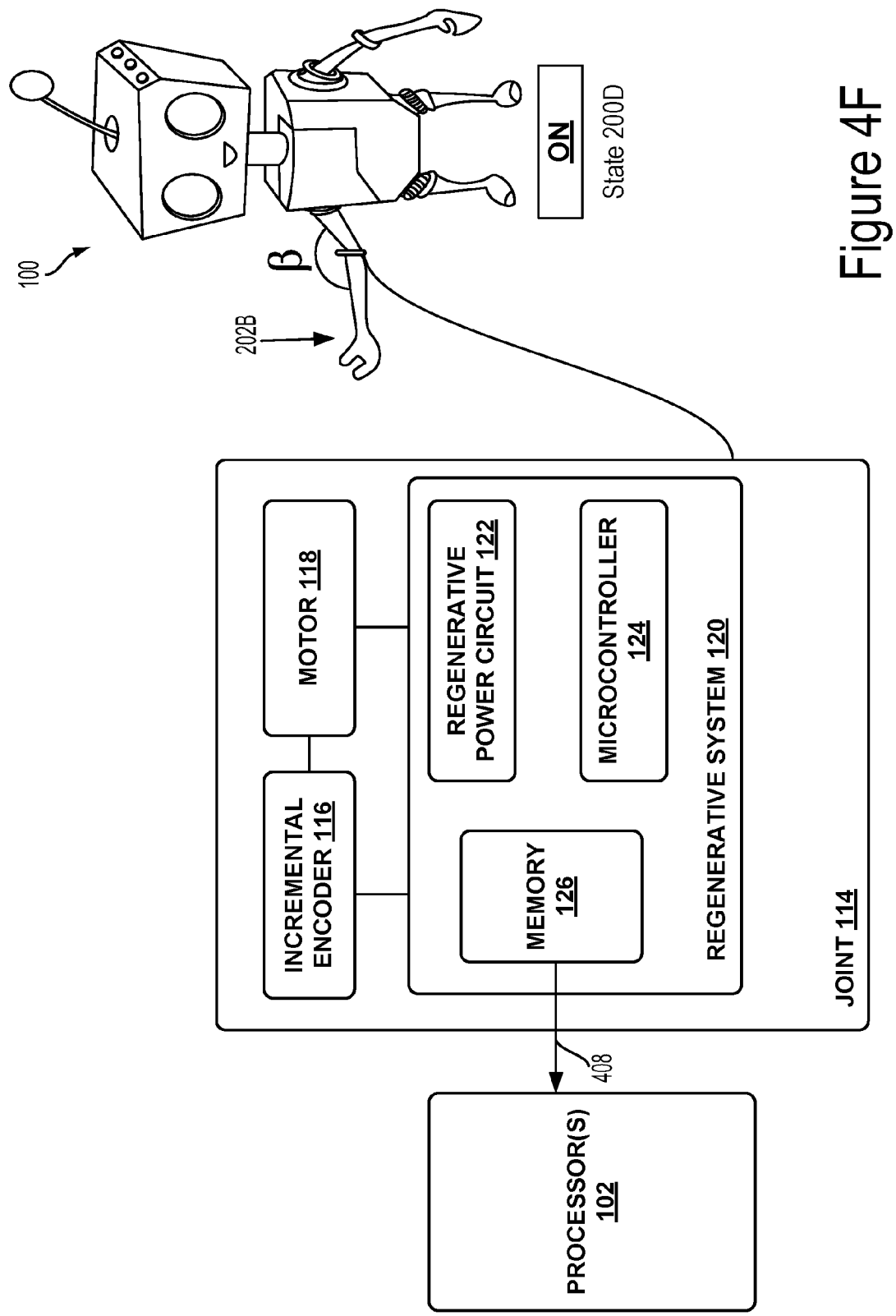

ENCODER UPDATE BY USING REGENERATIVE POWER

CROSS REFERENCE TO RELATED APPLICATION

The present patent application claims priority to U.S. application Ser. No. 14/989,898, filed on Jan. 7, 2016, the contents of which are entirely incorporated herein by reference, as if fully set forth in this application. U.S. application Ser. No. 14/989,898 then claims priority to U.S. application Ser. No. 14/488,533, filed on Sep. 17, 2014, the contents of which are entirely incorporated herein by reference, as if fully set forth in this application.

BACKGROUND

Robotic systems may be used for applications involving material handling, welding, assembly, and dispensing, among others. Over time, the manner in which these robotic systems operate is becoming more flexible and adaptable. As robotic systems become increasingly prevalent in numerous aspects of modern life, the desire for efficient robotic systems has become apparent. Consequently, a field of innovation in power systems, actuators, sensing techniques, as well as component design and assembly has been opened.

SUMMARY

Example implementations may relate to updating the position of an incremental encoder while a robotic system is powered off. As a motor causes mechanical rotation of a link about a joint of the robotic system, an incremental encoder may be used to measure this rotation. Rotation of the link about the joint while the robotic system is powered off may cause the motor to generate electric power. Such electric power may be stored and used by a regenerative system that is connected to the incremental encoder in order to update the position of the incremental encoder while the robotic system is powered off. Once the robotic system powers on, the robotic system may determine the updated rotary position of the joint without the need for recalibration.

In one aspect, a robotic system is provided. The robotic system includes an incremental encoder coupled to a joint of the robotic system, where the incremental encoder is configured to provide outputs that indicate angular positions of the joint. The robotic system also includes a memory configured to receive the outputs that indicate the angular positions of the joint from the incremental encoder, and to store representations of the angular positions of the joint. The robotic system additionally includes a motor coupled to the joint and configured to cause rotation of the joint, where the robotic system powering off causes the motor to power off, and where rotation of the joint while the motor is powered off (i) causes rotation of the motor such that electric power is generated, and (ii) updates a first angular position of the joint to a second angular position of the joint. The robotic system further includes a regenerative power circuit configured to receive the electric power and use the electric power to power on the incremental encoder and the memory while the robotic system is powered off. The robotic system yet further includes one or more processors configured to (i) determine, while the robotic system is powered on prior to powering off, output of the incremental encoder indicating the first angular position of the joint, and (ii) obtain, when the robotic system powers on after being powered off, information related to the second angular position of the joint from the memory, where the incremental encoder provides the information related to the second angular position of the joint to the memory while the robotic system is powered off.

In another aspect, a method is provided. The method involves determining by one or more processors, while a robotic system is powered on before powering off, output of an incremental encoder indicating a first angular position of a joint of the robotic system, where the incremental encoder and a motor are coupled to the joint, where rotation of the joint is caused by the motor, where the robotic system powering off causes the motor to power off, where rotation of the joint while the motor is powered off (i) causes rotation of the motor such that electric power is generated and (ii) updates the first angular position of the joint to a second angular position of the joint, and where the electric power is used to power on the incremental encoder and a memory while the robotic system is powered off. The method also involves obtaining by the one or more processors, when the robotic system powers on after being powered off, information related to the second angular position of the joint from the memory, where the incremental encoder provides the information related to the second angular position of the joint to the memory while the robotic system is powered off.

In yet another aspect, a non-transitory computer readable medium is provided. The non-transitory computer readable medium has stored therein instructions executable by one or more processors to cause a robotic system to perform operations. The operations include determining, while the robotic system is powered on before powering off, output of an incremental encoder indicating a first angular position of a joint of the robotic system, where the incremental encoder and a motor are coupled to the joint, where rotation of the joint is caused by the motor, where the robotic system powering off causes the motor to power off, where rotation of the joint while the motor is powered off (i) causes rotation of the motor such that electric power is generated and (ii) updates the first angular position of the joint to a second angular position of the joint, and where the electric power is used to power on the incremental encoder and a memory while the robotic system is powered off. The operations also include obtaining, when the robotic system powers on after being powered off, information related to the second angular position of the joint from the memory, where the incremental encoder provides the information related to the second angular position of the joint to the memory while the robotic system is powered off.

In yet a further aspect, a system is provided. The system may include means for determining, while the robotic system is powered on before powering off, output of an incremental encoder indicating a first angular position of a joint of the robotic system, where the incremental encoder and a motor are coupled to the joint, where rotation of the joint is caused by the motor, where the robotic system powering off causes the motor to power off, where rotation of the joint while the motor is powered off (i) causes rotation of the motor such that electric power is generated and (ii) updates the first angular position of the joint to a second angular position of the joint, and where the electric power is used to power on the incremental encoder and a memory while the robotic system is powered off. The system may also include means for obtaining, when the robotic system powers on after being powered off, information related to the second angular position of the joint from the memory, where the incremental encoder provides the information related to the second angular position of the joint to the memory while the robotic system is powered off.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 4A-4F illustrate using regenerative power to update an encoder, according to an example implementation.

DETAILED DESCRIPTION

Figure 1:
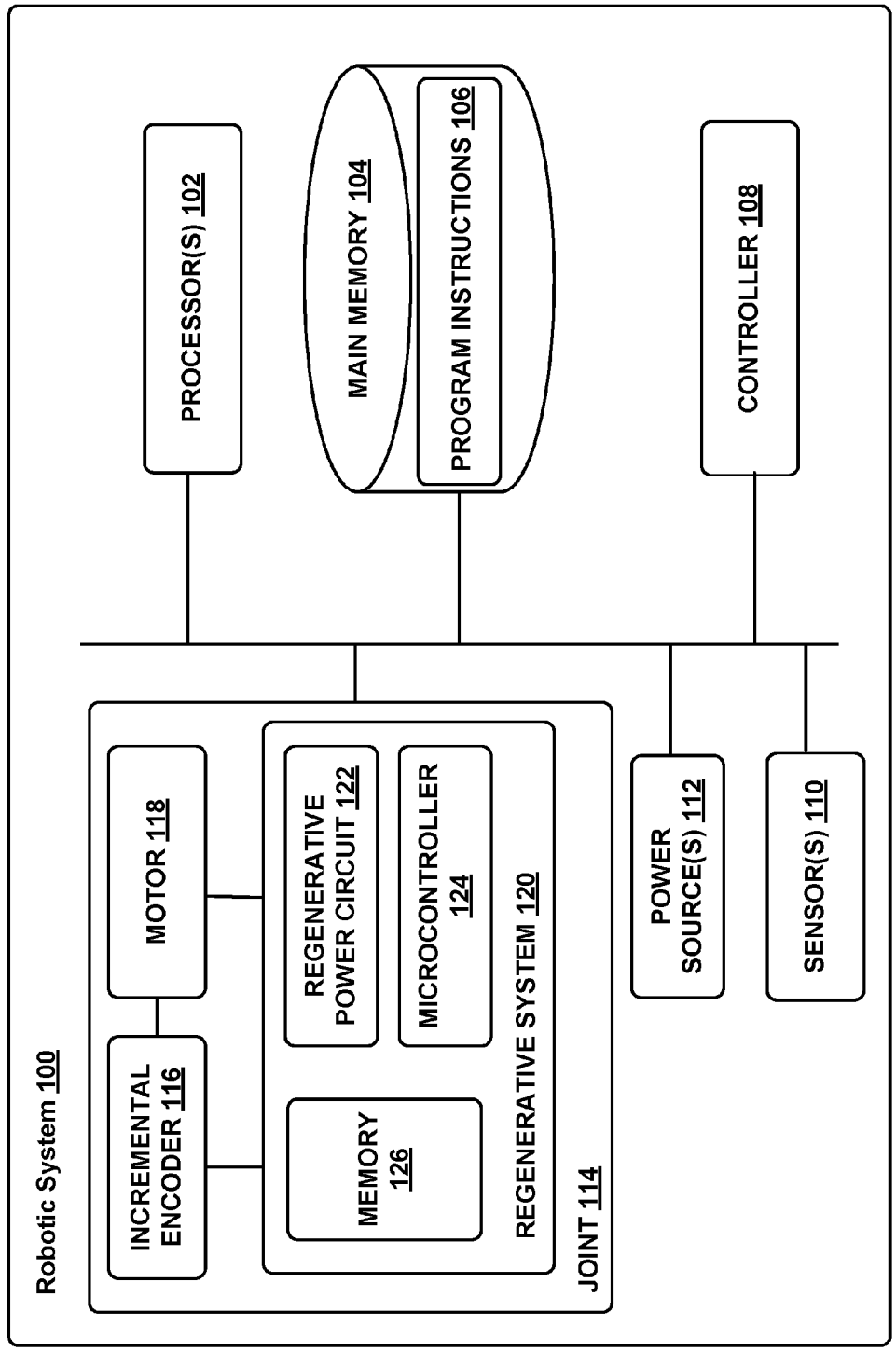
FIG. 1 illustrates a robotic system, according to an example implementation.

Example implementations are described herein. It should be understood that the words "example," "exemplary," and "illustrative" are used herein to mean "serving as an example, instance, or illustration." Any feature described herein as being an "example," being "exemplary," or being "illustrative" is not necessarily to be construed as preferred or advantageous over other features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Example implementations described herein may relate to using regenerative power to update a position of an encoder, which is coupled to a joint of a robotic system, while the robotic system is powered off. An articulated robotic system (e.g., a humanoid robot) may include robot arms and legs, among other appendages. A robot arm, for example, may include two links connected at a joint such that at least one of the links can rotate about the joint (e.g., a robotic arm can be bent and then extended). In particular, an actuator (e.g., an electric motor) positioned at or near the joint may cause such rotation of the link about the joint.

An actuator is a mechanism that may be used to introduce mechanical motion. In robotic systems, actuators may be configured to convert provided or stored energy into movement of various parts of the robotic system. For example, in humanoid robots, actuators may be responsible for movement of robotic arms, legs, and a head. Additionally, various mechanisms may be used to power an actuator. For instance, actuators may be powered by chemicals, hydraulics, compressed air, or electricity, among other possibilities. Further, in some cases, an actuator may be a rotary actuator that may be used in systems involving rotational forms of motion (e.g., an elbow or knee joint in a humanoid robot). However, in other cases, an actuator may be a linear actuator that may be used in systems involving straight line motion.

As a motor causes rotation of the link about the joint, an encoder may be used to measure this rotation. For example, a rotary encoder may be used to convert a rotary position to an analog or digital electronic signal used by an on-board computing system to determine the amount of rotation from a fixed reference angle, as well as the new rotary position.

The two main types of encoders are absolute encoders and incremental encoders. An absolute encoder indicates a current angle of the encoder. Additionally, the absolute encoder can maintain position information even when the system is powered off. That is, if a robotic system is powered off and the joint angle changes (e.g., due to a human repositioning the robotic arm) the absolute encoder can maintain enough information so that the new angle of the joint can be determined when the robotic system is powered on.

In contrast, an output of an incremental encoder includes information about motion of the shaft that is generally processed and interpreted elsewhere into information relevant to current position of the shaft. However, in some cases, an incremental encoder may include logic (e.g., circuitry) for interpreting the information and providing the current position.

Generally, for incremental encoding in a rotary system, a transparent piece of material can have a pattern printed onto piece such that there are two tracks of alternating opaque/transparent patterns (ticks). (These tracks would be on the edge of a disc for a rotary system, but the same technique could be used on linear track as well.) To read the encoder, two light sources (one associated with each track) may be located on one side of the disc, and two light sensors may be located on the other side. When the sensor detects light, the sensor may determine that the associated track has a transparent portion of the track under the read head, and when there is no light, the sensor may determine that the sensor is under an opaque section. The pattern used for each track may have a 50/50 duty cycle and overlap the A and B tracks in phase. Using a 0 to indicate transparent and 1 to indicate opaque, the following is an example of the information each track may encode:

A::0011001100110011001100110011001100110-011001100110011

B::0110011001100110011001100110011001100-110011001100110

The 90 degree phase difference shown above may be referred to as "quadrature". And the cycle above is referred to as a "quadrature cycle" because the cycle includes repeating 4-bit patterns (e.g., 0011).

Given any state of A and B, there is a second state one tick to the right of it, and a third state to the left of it. By observing which state the system is in, and which state the system goes to next, the circuit can determine if the encoder has moved one tick to the left, one tick to the right, or has remained in the same place. This allows the system to determine the relative position of the wheel at any given point in time to +/−½ of a tick. In this manner, an output of an incremental encoder coupled to a joint may represent an amount of rotation of the joint (e.g., clockwise or counterclockwise).

To know the absolute position on the wheel, a third track—often called the Index (or I) track—can be added to the rotary encoder. The index track usually contains one opaque tick mark on the entire track. The mark on the I track can be just one tick wide, or wider (e.g., four ticks wide, i.e., an entire quadrature cycle). With this configuration, when the system does not know a current position (e.g., a rotational position of a robotic arm is unknown), the system can determine the position by rotating the shaft until the system finds the edge of the index pulse. Once the edge of the index pulse is found, the system can use the index pulse as a precise determination of a reference position. Building off of the example above, the index pulse might be as follows.

| | | |
|---|---|---|
| A | : : | 0011001100110011001100110011001100110011001100110011001100110011 |
| B | : : | 0110011001100110011001100110011001100110011001100110011001100110 |
| I | : : | 0000000000000000000011110000000000000000000000000000000000000000 |
| | | ↑ |
| | | Index Pulse |

However, the drawback to this configuration is that every time the rotary system is initialized, the disc may need to be rotated until the index pulse is located. (The process of finding the index pulse is sometimes referred to as "homing."). Thus, when using an incremental encoder, a loss of power in the system may cause the robot to lose track of the absolute positioning in the robot joints. This may require the robot to home some or all of its joints upon powering back on. Note that the three track (A/B/I) may be logical and may thus physically overlap.

An incremental encoder may be selected for use over an absolute encoder due to a lower cost and a capability of providing signals that are easily interpreted to provide the position/motion information. However, an absolute encoder may be selected for use over an incremental encoder due to its ability to store joint angle even when the system is powered off. Disclosed herein is a solution that may use regenerative power to store updates to a position of an incremental encoder when the power is not otherwise supplied to the incremental encoder. Thus, an example implementation may include a low cost incremental encoder without the system having to "home" after each power-up.

A regenerative system may capture kinetic energy and store such energy (e.g., as power storage) for use at a later time. For example, the motor may be used as a generator to convert mechanical motion of the motor to electric energy. By adding a regenerative power circuit to the robot's joint, movement in the joint may power the regenerative power circuit. In particular, rotation of the motor creates regenerative electric power that may be stored in the regenerative power circuit.

In a scenario when the robotic system runs out of power (or is turned off), any movement of the joint may create this regenerative power to supply power to a microcontroller unit (MCU) that stores the angle or the changes to the angle of the joint. Such an MCU may be separate from the main on-board controller of the robotic system. Additionally, the MCU may be connected to a particular joint or may be connected to several joints.

More specifically, the regenerative power circuit may be used to power on the MCU, memory storage, and the incremental encoder. The MCU may read the output of the incremental encoder and subsequently store the information in the memory storage. Thus, even when the robotic system is not powered on, this arrangement provides sufficient power to allow the system to update and store rotary position information of one or more joints.

As such, upon the robotic system regaining power, the system may obtain the information that was stored in the memory storage while the robotic system was powered off. The information may include the precise current angles of its joints. Thus, the system may proceed without recalibrating. In this manner, the need for the absolute encoder is removed, thereby reducing the cost of the system.

II. EXAMPLE ROBOTIC SYSTEM

Referring now to the figures, FIG. 1 shows an example configuration of a robotic system 100. The robotic system 100 may be a humanoid robot or a quadrupedal robot, among other examples. The robotic system 100 may also be referred to as a robotic device or robot.

The robotic system 100 is shown to include processor(s) 102, a main memory 104 (i.e., data storage), program instructions 106, controller 108, sensor(s) 110, power source(s) 112, and example joint 114. Example joint 114 may include an incremental encoder 116, a motor 118, and a regenerative system 120. Regenerative system 120 may include a regenerative power circuit 122, a microcontroller 124, and memory 126. The robotic system 100 is shown for illustration purposes. Thus, robotic system 100 may include additional components and/or have one or more components removed without departing from the scope of the invention. Further, the various components of robotic system 100 may be connected in any manner.

Processor(s) 102 may be general-purpose processors or a special purpose processor (e.g., digital signal processors, application specific integrated circuits, etc.). The processor(s) 102 can be configured to execute computer-readable program instructions 106 that are stored in the main memory 104 and are executable to provide the functionality of the robotic system 100 described herein. For instance, the program instructions 106 may be executable by the processor(s) 102 to provide functionality of controller 108 (and/or microcontroller 124), where the controller 108 may be configured to operate the motor 118. Such a controller 108 may be part of the processor(s) 102 or may be separate.

In particular, robotic system 100 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, ARCOS (advanced robotics control operating system), or proprietary software. A robot operating system may include functionality to control components of a robot, such as head tracking, base movement (e.g., velocity control, navigation framework), etc.

The main memory 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the main memory 104 can be implemented using a single physical device (e.g., one optical, magnetic, organic or other memory or disc storage unit), while in other embodiments, the main memory 104 can be implemented using two or more physical devices. Further, in addition to the computer-readable program instructions 106, the main memory 104 may include additional data such as diagnostic data, among other possibilities.

The robotic system 100 may include one or more sensor(s) 110 such as a gyroscope or an accelerometer to measure movement of the robotic system 100. The sensor(s)

100 may also include any of Global Positioning System (GPS) receivers, sonar, optical sensors, biosensors, Radio Frequency identification (RFID) sensors, Near Field Communication (NFC) sensors, wireless sensors, and/or compasses. Other sensor(s) 110 may further include smoke sensors, light sensors, radio sensors, microphones, speakers, radar, capacitive sensors, touch sensors, cameras (e.g., color cameras, grayscale cameras, and/or infrared cameras), depth sensors (e.g., Red Green Blue plus Depth (RGB-D), lasers, structured-light, and/or a time-of-flight camera), motion detectors (e.g., an inertial measurement unit (IMU), and/or foot step or wheel odometry), and/or range sensors (e.g., ultrasonic and/or infrared), among others. The sensor(s) 110 may provide sensor data to the processor(s) 102 and/or main memory 104 to allow for appropriate interaction of the robotic system 100 with environment.

Further, the robotic system 100 may also include one or more power source(s) 112 configured to supply power to various components of the robotic system 100. Any type of power source may be used such as, for example, a gasoline engine or a battery. Other examples may also be possible.

The robotic system 100 may also have components or devices that allow the robotic system 100 to interact with its environment (i.e., surroundings). For example, the robotic system 100 may have mechanical actuators (e.g., motor 118), wheels, movable arms, etc., that enable the robotic system 100 to move and/or interact with the environment in order to carry out various tasks. More specifically, the motor 118 may be a brushed DC motor, a brushless DC motor, or an AC motor such as a synchronous electric motor or an induction motor, among other possibilities. The motor 118 may include a motor shaft, a stationary stator, and a rotor coupled to the motor shaft such that the motor shaft is configured to deliver mechanical power to a transmission assembly, thereby causing a rotation of the transmission assembly (which may be coupled to joint 114).

In particular, the stator may be a stationary part of motor 118. For example, the stator may include an electromagnet and a coil including windings that can be composed of any conductive material. On the other hand, the rotor may be a non-stationary portion of the motor 118 and may include conductors that interact with a magnetic field produced by the windings in the stator. Such an interaction may result in the development of a torque that can cause a rotation of the rotor about an axis, thereby allowing the motor shaft to deliver mechanical power. Other components may also be included and additional motor configurations may also be possible.

Additionally, robotic system 100 may include various appendages such as robot arms and legs, among others. Each such appendage may include one or more joints such as example joint 114. For instance, two links may be connected at joint 114 such that at least one of the links can rotate about the joint 114 (e.g., a robotic arm is bent and then extended). In particular, the motor 118 may be positioned at or near the joint 114 (among other possible locations) and may cause such rotation of the link about the joint 114. When the motor 118 causes rotation of the link about the joint 114, an encoder (e.g., incremental encoder 116) may be used to measure this rotation. For example, incremental encoder 116 may be used to convert a rotary position to an analog or digital electronic signal used by processor(s) 102 to determine the amount of rotation from a fixed reference angle. Based on this amount of rotation, robotic system 100 may determine the new rotary position of the joint 114.

In one case, the incremental encoder 116 may be positioned at or near the joint 114 in order to determine the amount of rotation. In another case, the incremental encoder 116 may be coupled to the motor 118. For example, a motor may be sold with an incremental encoder. An incremental encoder coupled to the motor may be used for motor control as well as to determine the amount of rotation, thereby reducing (or eliminating) the need for additional encoders. Other cases may also be possible.

Note that the incremental encoder 116 may output a phase signal such as a pulse. Processor(s) 102 may then translate (e.g., using transformers) the phase signal to data representative of an angle value. For instance, the processor(s) 102 may count pulses in the phase signal in order to determine the angle value.

Implementations disclosed herein relate to using regenerative power to update a position of the incremental encoder 116, which is coupled to the joint 114 of the robotic system 110, while the robotic system 100 is powered off. In an example implementation, a regenerative system 120 may be coupled to the joint 114. The regenerative system 120 may include a regenerative power circuit 122, a microcontroller 124, and memory 126.

The regenerative power circuit 122 may be configured to store electric power and provide the electric power to the microcontroller 124, to the memory 126, and to the incremental encoder 116. More specifically, the regenerative power circuit 122 may include one or more energy storage components such as capacitors and/or inductors, among other possibilities. Additionally, the regenerative power circuit 122 may include one or more components (e.g., diodes and/or transistors) configured to route the electric power to the microcontroller 124, to the memory 126, and to the incremental encoder 116. Further, such electric power may be supplied by the motor 118, among other possible sources.

In particular, during normal operation as discussed above, electric power supplied to motor 118 may produce mechanical power to cause a rotation of the transmission assembly, thereby causing rotation of the link about the joint 114. However, when mechanical power is supplied to the motor 118 that results in rotation of the motor 118, the motor 118 may produce electric power even when the motor 118 is powered off (effectively becoming a generator). The mechanical power may result, for example, from movement of the link connected to joint 114. In one example, such movement of the link may result due to an external mechanical force applied to the link (e.g., a human repositioning a robot arm). In another example, movement of the link may result due to momentum of the link resulting from movement of the link prior to the motor 118 powering off. Other examples may also be possible. As such, the electric power produced by motor 118 may be transmitted to (and stored by) the regenerative power circuit 122.

In a further aspect, the robotic system 100 may include a braking unit (not shown) configured to decelerate (or stop) rotation of the motor shaft (i.e., resulting in deceleration and stopping of the link). When the braking unit is activated, the motor 118 may reverse direction to apply negative torque to counteract momentum of the link. When negative torque is applied, electric energy may be produced (i.e., regenerated) by the motor 118. Rather than allowing the electric energy to dissipate (such as by converting the electric energy to heat using one or more resistors), the regenerative power circuit 122 may be configured to store the electric energy that is generated in this manner.

Microcontroller 124 (which may also be a microprocessor) may be powered on by the regenerative power circuit 122 and may be configured to execute computer-readable program instructions (not shown) that are stored in the memory 126 and are executable to provide the functionality of the regenerative system 120. Additionally, as further discussed below, the microcontroller 124 may be configured to determine an output of the incremental encoder 116. Upon determining the output of the incremental encoder 116, the microcontroller 124 may send the output for storage in memory 126.

Note that, in some implementations, microcontroller 124 may be combined with the main controller 108 of the robotic system 100. Additionally, in some implementations, memory 126 may be combined with the main memory 104 of the robotic system 100. Other examples and combinations may also be possible. Further, note that the microcontroller 124 may be referred to as a microcontroller unit (MCU) or a controller, among others.

Figure 2:
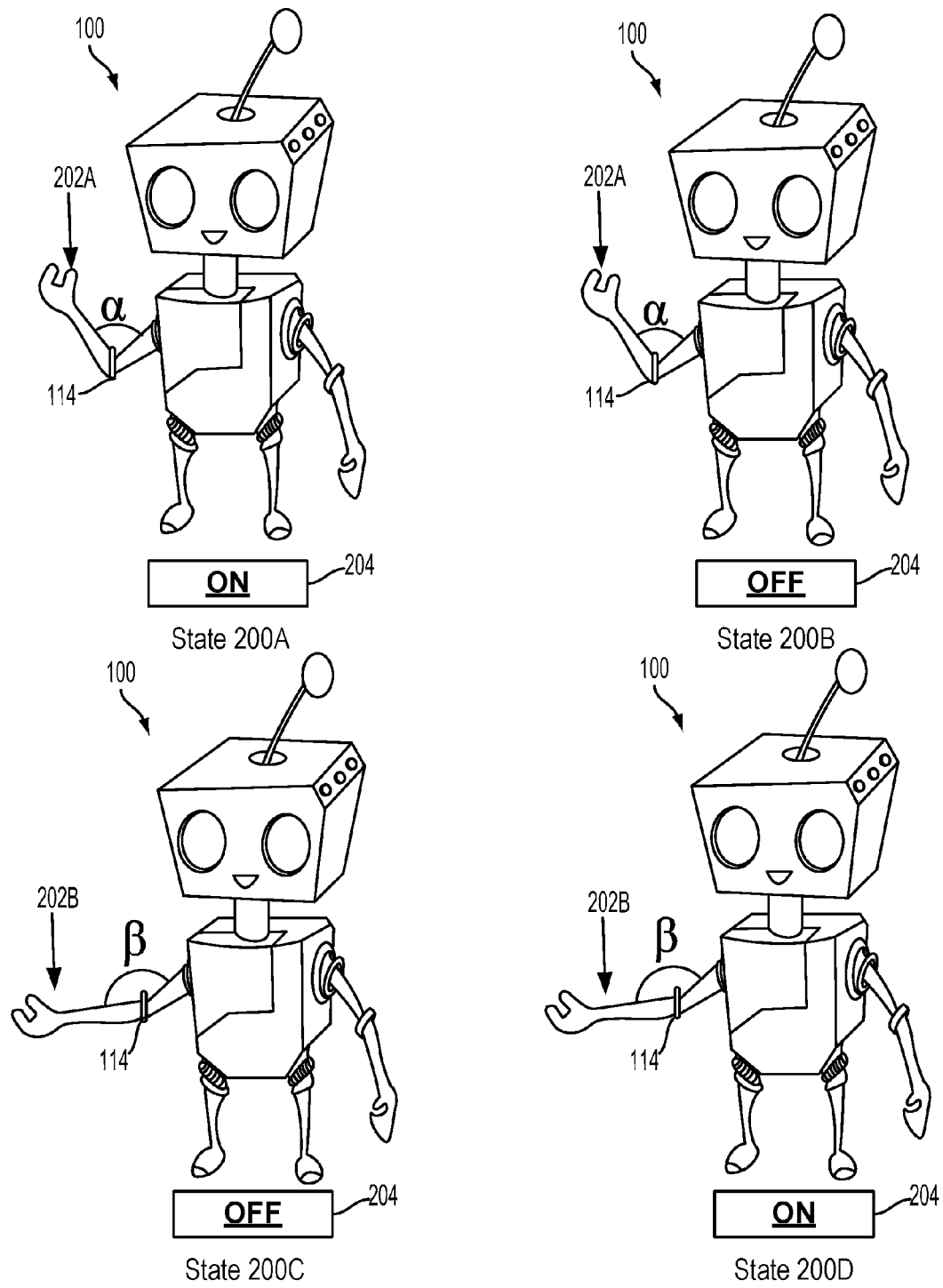
FIG. 2 illustrates a sequence of robot states, according to an example implementation.

The robotic system 100 may take on various forms. To illustrate, consider FIG. 2 showing robotic system 100 as a conceptual graphical representation. Robotic system 100 is shown as a mechanical form of a humanoid including arms, legs, and a head. However, robotic system 100 may take on any other form and may be configured to receive any number of modules or components which may be configured to operate the robotic system 100.

FIG. 2 shows an example scenario, as a sequence of robot states 200A-200D. As illustrated by robot state 200A, a link of robotic system 100 may be configured in a position 202A (e.g., bent robot arm) where the joint 114 angular position is represented by a (e.g., the output of incremental encoder 116 coupled to the joint 114). Additionally, during robot state 200A, the robotic system 100 is powered on as illustrated by status indicator 204. At robot state 200B (i.e., a later point in time) the robotic system 100 may power off as illustrated by the status indicator 204. The robotic system 100 powering off may involve all (or some) of the components of the robotic system 100 powering off. For instance, motor 118 (coupled to joint 114) may power off such that the robotic system 100 can no longer reposition the link.

The robotic system 100 may power off for various reasons. In one example, the robotic system 100 may be powered off intentionally, such as by a human turning off a power switch. In another example, the robotic system 100 may be powered off unintentionally, such as due to power depletion in power source(s) 112 or due to a fault in the power source(s) 112. Other examples may also be possible.

Robot state 200C illustrates a point in time after robot state 200B, while the robotic system 100 is still powered off, where the link moves from position 202A to position 202B (e.g., the bent robot arm extending) and where the joint 114 angular position is represented by β. This movement of the link results in an updated rotary position of the joint 114 and thereby results in an updated rotary position of the incremental encoder 116. Additionally, as mentioned above, such movement of the link may be due to various reasons. In one example, such movement of the link may result due to an external mechanical force applied to the link (e.g., a human repositioning a robot arm). In another example, movement of the link may result due to momentum of the link resulting from movement of the link prior to the motor 118 powering off. Other examples may also be possible.

Further, robot state 200D illustrates a later point in time after robot state 200C when the robotic system 100 powers back on. When the robotic system 100 powers on, the link of robotic system 100 may now be configured in the new position 202B (e.g., extended robot arm). As mentioned above, when using an incremental encoder 116, a loss of power in the robotic system 100 may cause the robotic system 100 to lose track of the absolute positioning in the joint 114. As a result, the robotic system 100 may need to "home" (i.e. recalibrate) one or more joints by causing rotation of the joints upon power-on. This may be energy inefficient and may lead to safety issues as various links of the robotic system 100 may be moving upon power-on.

As further discussed below, the proposed solution discussed herein eliminates the need for the absolute encoder due to the implementation of the regenerative system 120. In this manner, removal of the absolute encoder may reduce costs of the robotic system 100 and may increase efficiency of the robotic system 100, among other possible advances.

III. EXAMPLE ENCODER UPDATE USING REGENERATIVE POWER

Figure 3:
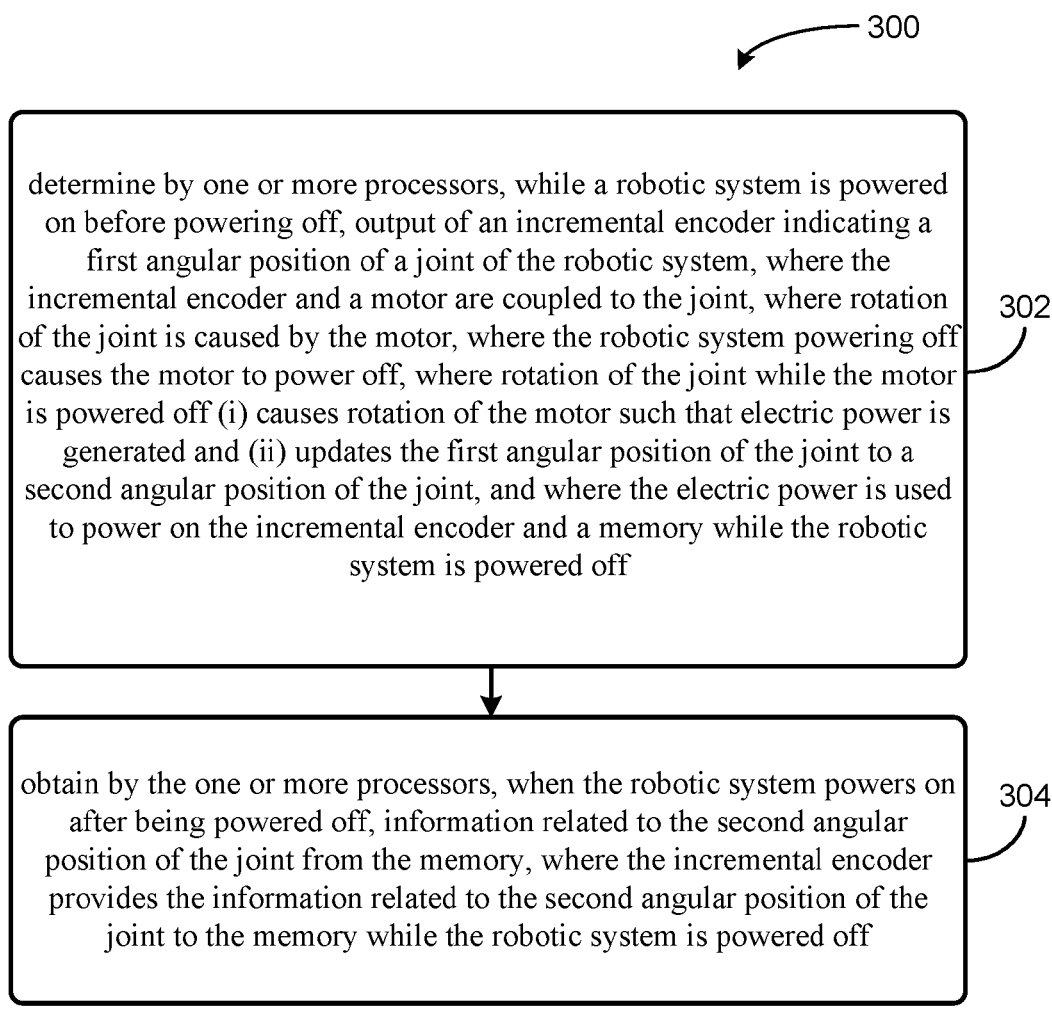
FIG. 3 is a flowchart illustrating a method for updating an encoder, according to an example implementation.

FIG. 3 is a flowchart 300, according to an example implementation. Flowchart 300 may be carried out in whole or in part by a component or components in a robotic system, such as by the one or more of the components of the robotic system 100 shown in FIG. 1. However, it should be understood that flowchart 300 may be carried out by other entities or combinations of entities (i.e., by other computing devices and/or combinations of computing devices).

Block 302 involves determining by one or more processor(s) 102, while a robotic system is powered on before powering off (e.g., state 200A in FIG. 2), output of an incremental encoder. The incremental encoder may indicate a first angular position of a joint (e.g., angle α in FIG. 2) of the robotic system. The incremental encoder and a motor may be coupled to the joint. Rotation of the joint may be caused by the motor. The robotic system powering off (e.g., state 200B in FIG. 2) may cause the motor to power off. Rotation of the joint while the motor is powered off (i) may cause rotation of the motor such that electric power is generated and (ii) may update the first angular position of the joint to a second angular position of the joint (e.g., transition from state 200B to 200C). The electric power may be used to power on the incremental encoder and a memory while the robotic system powered off.

Block 304 involves obtaining by the one or more processors, when the robotic system powers on after being powered off (e.g., state 200D in FIG. 2), information related to the second angular position (e.g., angle β in FIG. 2) of the joint from the memory. The incremental encoder may provide the information related to the second angular position of the joint to the memory while the robotic system is powered off.

Figure 4A:
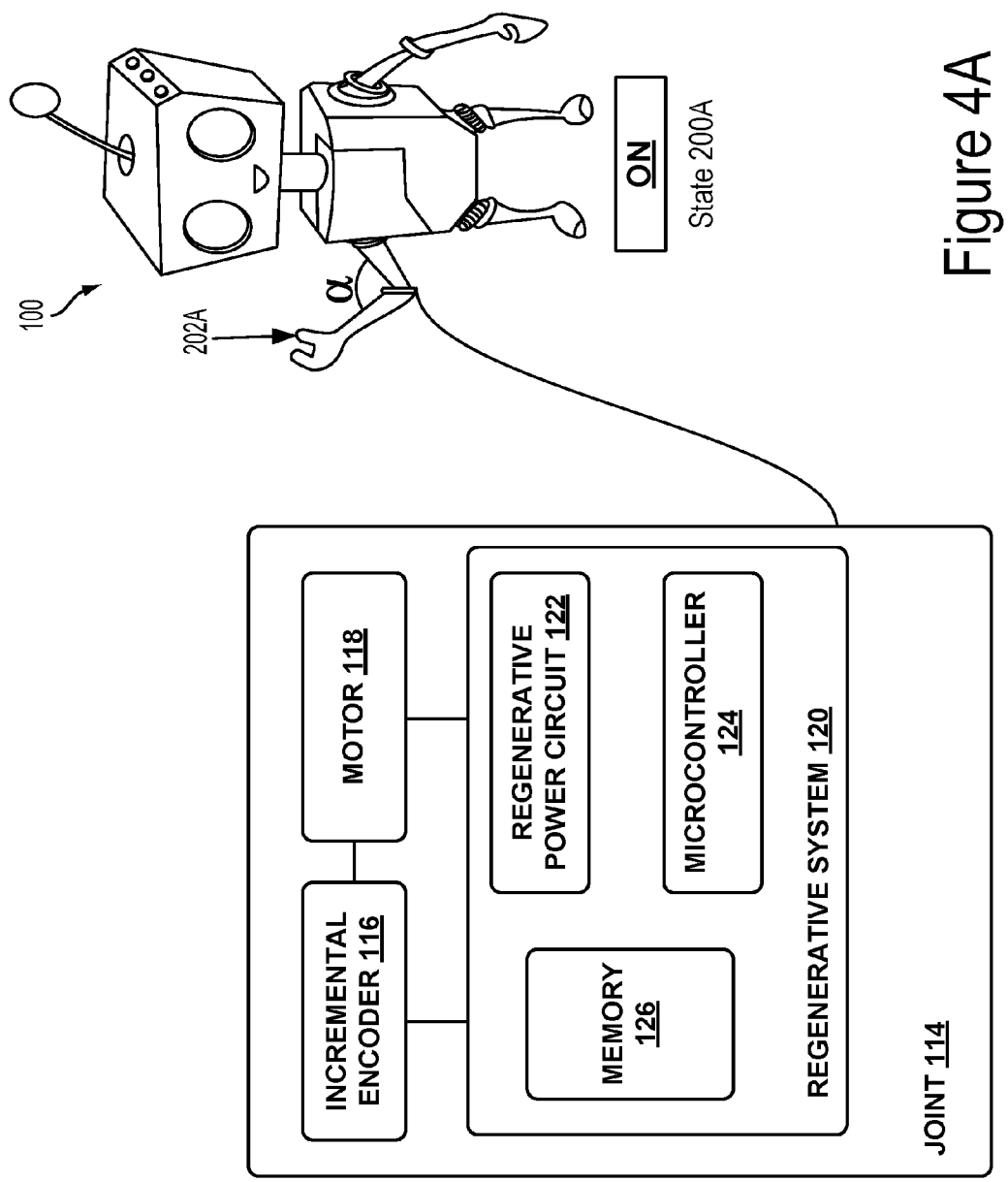

To illustrate method 300, consider FIGS. 4A-4F showing the robot states first presented in FIG. 2 as well as example joint 114 first presented in FIG. 1. FIG. 4A shows robotic system 100 in robot state 200A, where the robotic system 100 is powered on, the link is configured in position 202A, and the joint 114 angular position is represented by a. During robot state 200A, the processor(s) 102 may determine the output the incremental encoder 116. In particular, the output of the incremental encoder 116 may include a representation of the angular position of the joint 114 relative to a fixed (e.g., starting) reference point. In this manner, any change in the angular position of the joint 114 is considered relative to the fixed reference point such that the robotic system 100 can determine the absolute angle of the joint 114.

FIG. 4B shows robotic system 100 in robot state 200B, where the robotic system 100 is powered off and the link remains configured in position 202A. When the robotic system 100 powers off, the incremental encoder 116 and the motor 118 may also power off. As such, when the motor 118 is powered off, the motor 118 may no longer move the link.

Additionally, when the incremental encoder 116 is powered off, the incremental encoder 116 may no longer determine a change in the angular position of the joint 114. Further, the processor(s) 102 may be configured to store (e.g., continuously or from time-to time) the angular position of the joint 114 in the main memory 104 and/or memory 126 such that the most up to date (i.e., a current) angular position of the joint 114 is stored (and is thus obtainable) while the robotic system 100 is powered off.

Figure 4C:
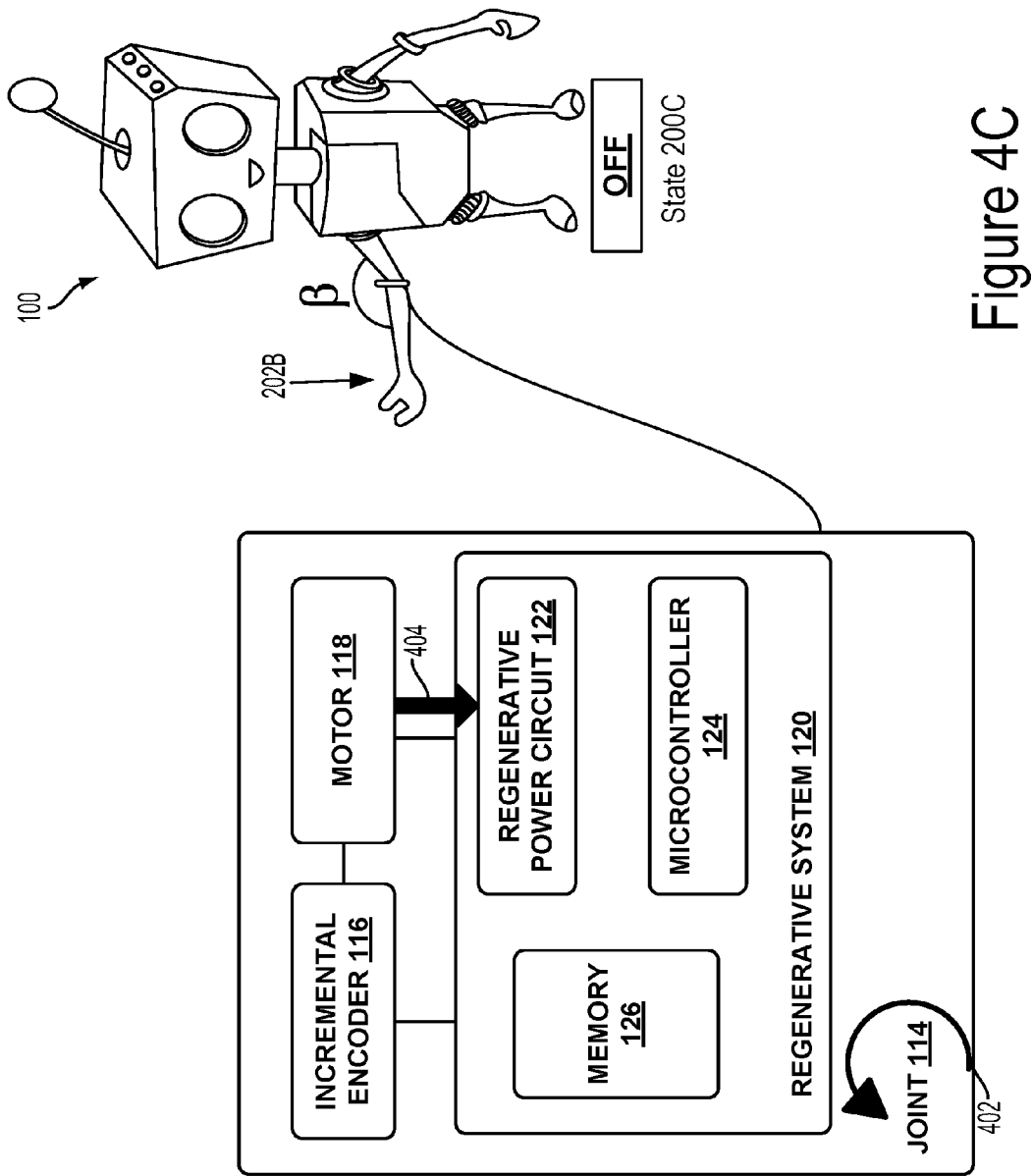

FIG. 4C shows robotic system 100 in robot state 200C, where the robotic system 100 is powered off and the link moves, while the motor 118 is powered off, from position 202A to 202B. Thus, the angular position of the joint 114 changes from a first angular position to a second angular position (e.g., α to β). Movement of the link may cause rotation 402 of the joint 114 and thereby cause rotation 402 of the motor 118. As discussed above, such rotation 402 of the motor 118 may generate electric power 404 (conceptually represented by the dotted arrow). The motor 118 may then transmit the generated electric power 404 to the regenerative power circuit 122, where the electric power 404 may be stored and/or further transmitted.

In some implementations, the regenerative power circuit 122 may be configured to determine how much electric power 404 is needed to power on the incremental encoder 116, the microcontroller 124, and/or the memory 126. The remaining electric power 404 may then be stored for later use by the regenerative power circuit 122. For instance, the regenerative power circuit 122 may use stored electric power 404 to automatically power on the microcontroller 124 when the robotic system 100 powers off (e.g., even prior to movement of the link).

Figure 4D:
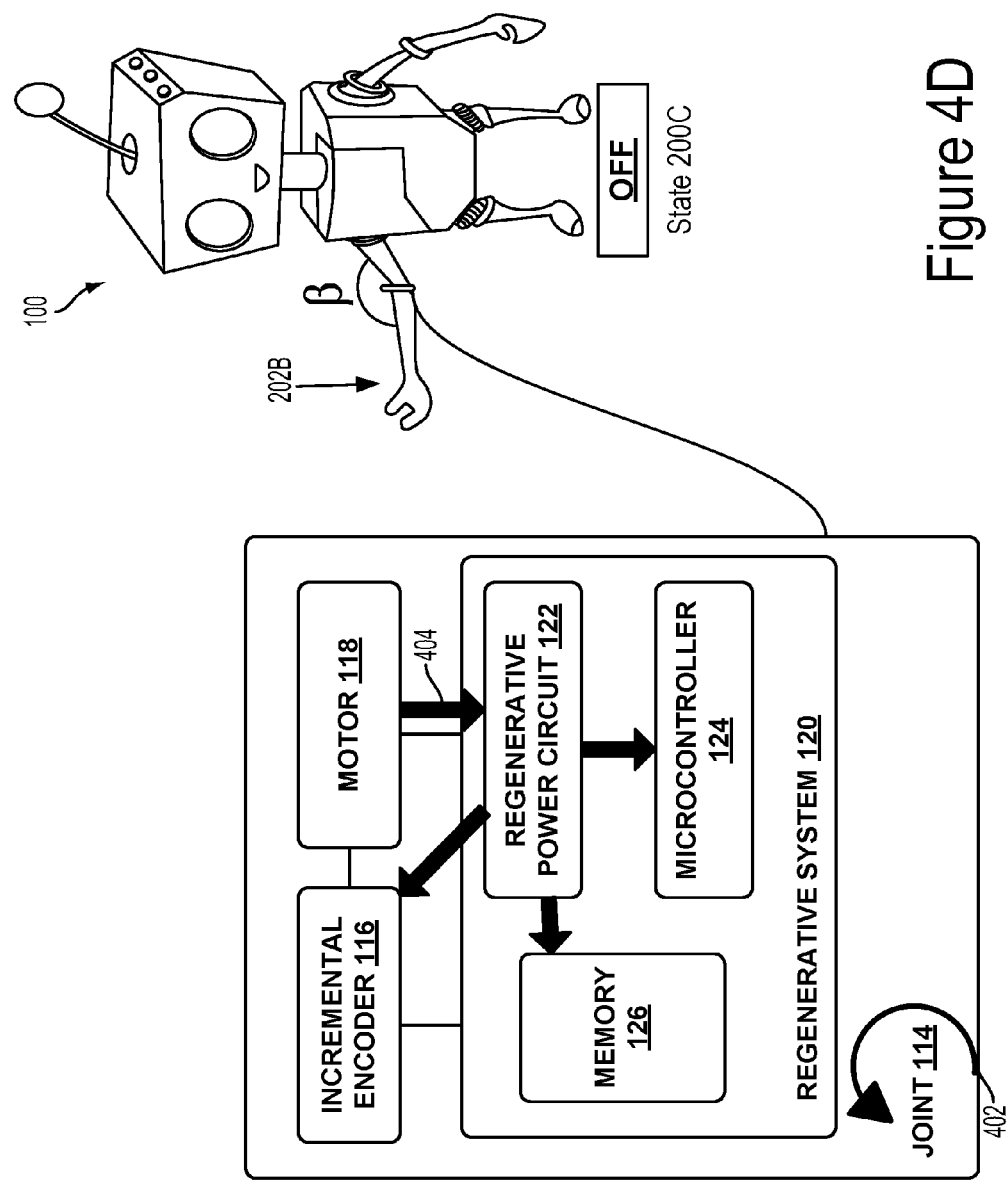

As shown in FIG. 4D, the regenerative power circuit 122 may be configured to use the electric power 404 to power on the incremental encoder 116, the microcontroller 124, and the memory 126 while the robotic system 100 is powered off. Subsequently, as illustrated by arrow 406A in FIG. 4E, the microcontroller 124 may determine the output of the incremental encoder 116.

Note that the incremental encoder 116, the microcontroller 124, and the memory 126 may power on as soon as the rotation 402 of the motor 118 begins. Additionally, the microcontroller 124 may begin obtaining the output of the incremental encoder 116 as soon as the incremental encoder 116 and the microcontroller 124 are powered on. In this manner, the microcontroller 124 can obtain information related the change in the angular position of the joint 114 rapidly, and continue obtaining such information as long as rotation 402 of the motor 118 continues while the robotic system 100 is powered off.

In a further aspect, the output of the incremental encoder 116 obtained by the microcontroller 124 may be a representation of the change in the angular position since the robotic system 100 powered off. In particular, as mentioned above, the most up to date angular position of the joint 114 may be stored in memory 126 and is thus obtainable while the robotic system 100 is powered off. As such, the microcontroller 124 may determine the change of the angular position of the joint 114 (e.g., the difference between β and α) relative to the angular position of the joint 114 when the robotic system 100 powered off (e.g., α).

Figure 4E:
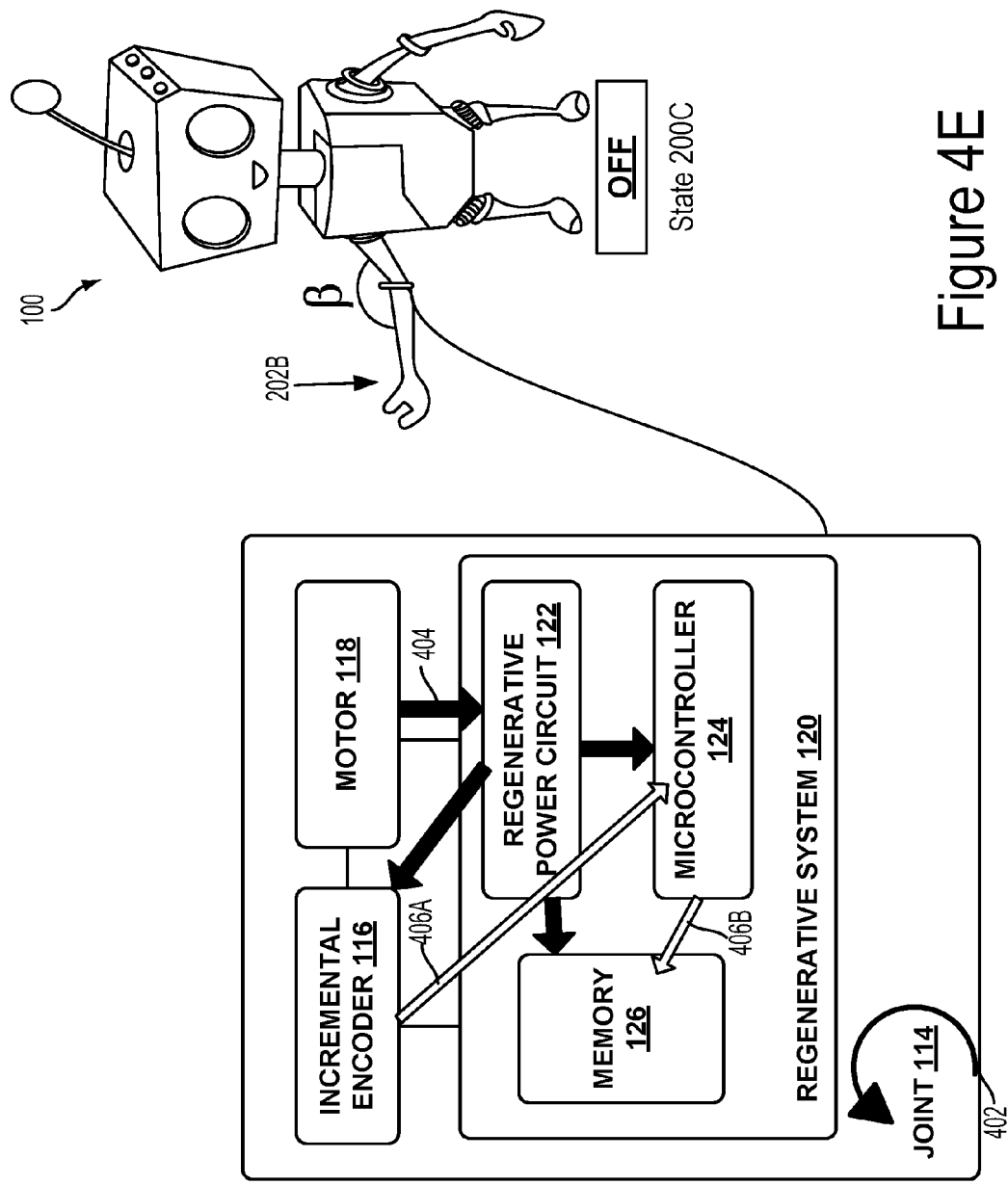

In an example embodiment, as illustrated by arrow 406B in FIG. 4E, the microcontroller 124 may send information related to updated angular position of the joint 114 to the memory 126. In one case, such information may include the change of the angular position of the joint 114 (e.g., the difference between β and α). In another case, the microcontroller 124 may determine the absolute updated angular position of the joint 114 (e.g., β) and store such information in the memory 126. In particular, the absolute updated angular position of the joint 114 may be determined by adding the (negative or positive) change in angular position of the joint (e.g., the difference between β and α) to the angular position of the joint 114 at the time that the robotic system 100 powered off (e.g., α). Other cases may also be possible.

FIG. 4F shows robotic system 100 in robot state 200D, where the robotic system 100 powered on and the link is in the updated position 202B such that the angular position of the joint 114 is an updated (i.e. second) angular position (e.g., β). When the robotic system 100 powers on, the processor(s) 102 may obtain information 408 related to output of the incremental encoder 116.

In one case, as mentioned above, the information 408 may include the change of the angular position of the joint 114 (e.g., the difference between β and α). In this case, the processor(s) may determine absolute angular position of the joint 114 by adding the (negative or positive) change in angular position of the joint (e.g., the difference between β and α) to the angular position of the joint 114 at the time that the robotic system 100 powered off (e.g., α). Note that the angular position of the joint 114 at the time that the robotic system 100 powered off (e.g., α) may be obtained by the processor(s) 102 from the main memory 104 and/or from memory 126.

In another case, if the absolute updated angular position of the joint 114 has already been determined while the robotic system 100 was powered off (e.g., such as by the microcontroller 124 as discussed above), the processor(s) 102 may obtain the absolute updated angular position of the joint 114 from memory 126. In either case, the robotic system 100 may determine the updated angular position of the joint 114 upon the robotic system 100 powering back on.

IV. EXAMPLE IMPLEMENTATIONS FOR MULTIPLE JOINTS

In an example embodiment, the methods and systems discussed above may be implemented in multiple joints of the robotic system 100. In one case, each joint (or some of the joints) of the robotic system 100 may be coupled to an incremental encoder 116, a motor 118, and a regenerative system 120. In this manner, the robotic system 100 can determine the absolute angular position of each joint (i.e., the overall configuration of the robotic system) even when various link of the robotic system 100 have been repositioned while the robotic system 100 was powered off.

In another case, a regenerative system 120 may be positioned anywhere in the robotic system 100 and may be connected to multiple joints each coupled with an incremental encoder and a motor. For instance, a first joint may be coupled to a first motor and a first incremental encoder while a second joint may be coupled to a second motor and a second incremental encoder. Rotation of the first motor while the robotic system 100 is powered off supplies electric power to the regenerative power circuit 122 (where the electric power may be stored) and the regenerative system 120 may determine an updated angular position of first joint. Additionally, rotation of the second motor while the robotic system 100 is powered off supplies electric power to the same regenerative power circuit 122 (where the electric power may be stored) and the same regenerative system 120 may determine an updated angular position of second joint. In this manner, multiple motors may supply electric power to a single regenerative system and the single regenerative system may determine updated angular positions of various joints while the robotic system is powered off.

In yet another case, some joints of the robotic system 100 may not be equipped with a motor 118 that can generate electric power when powered off (e.g., such as the motor 118 coupled to example joint 114). For example, a given joint may be equipped with a hydraulic actuator. In this case, the regenerative system 120 may be connected to an incremental encoder that is coupled to the given joint and the regenerative system 120 may be configured to determine a change in the angular position of the given joint while the robotic system 100 is powered off.

In particular, an example implementation may involve the regenerative system 120 connected to a first incremental encoder on a first joint and a second incremental encoder on a second joint. The first joint (e.g., joint 114) may be coupled to a motor 118 such that rotation of the motor 118 while the robotic system 100 is powered off supplies electric power to the regenerative power circuit 122 (where the electric power may be stored). In contrast, the second joint may be coupled to an actuator that does not supply electric power to the regenerative power circuit 122.

However, when movement of a link connected to the second joint causes a change in the angular position of the second joint, the regenerative power circuit 122 may use stored electric power (e.g., previously obtained from the motor 118 coupled to the first joint) to power on the second incremental encoder (as well as components of the regenerative system 120). In other implementations, the second incremental encoder may power on automatically. The microcontroller 124 may then determine, while the robotic system 100 is powered off, the updated angular position of the second joint and send such information to memory 126. Note that the regenerative system 120 may use various sensing techniques (e.g., force sensors and/or position sensors) to determine movement of the link connected to the second joint (e.g., despite the lack of electric power input from a motor to the system 120) such that the regenerative system 120 responsively powers on the second incremental encoder and other components. Other cases may also be possible.

V. EXAMPLE SAFETY POSITIONS

In an example implementation, the regenerative system 120 may be used to reposition the robotic system 100 to a safe configuration when the robotic system 100 powers off. As mentioned above, the regenerative power circuit 122 may use stored electric power to automatically power on the incremental encoder 116, the microcontroller 124, and memory 126 when the robotic system 100 powers off. In some implementations, the incremental encoder 116, the microcontroller 124, and memory 126 may remain powered on as long as the regenerative power circuit has sufficient electric power. In other implementations, the incremental encoder 116, the microcontroller 124, and memory 126 may remain powered for a predetermined period of time.

The microcontroller 124 may be configured to determine whether a current angular position of the joint 114 corresponds to a safe angular position. More specifically, the microcontroller 124 may obtain from memory 126 the current angular position of the joint 114 when the robotic system 100 powers off (i.e., the most recent position stored in the memory prior to the robotic system powering off). Subsequently, the microcontroller 124 may query a database in memory 126 to determine whether the current angular position of the joint 114 corresponds to a predetermined safe angular position of the joint 114.

In one example, a safe angular position of a joint may correspond to a stable position of the robotic system 100 such that, for example, the robotic system 100 does not fall to the ground due to momentum from movement of the system just prior to the system powering off (i.e., avoiding damage components of the system). In another example, if the robotic system 100 does fall to the ground due to momentum, the safe angular position may correspond to a predetermined position that may minimize damage to components of the system. Other examples may also be possible.

If the microcontroller 124 determines that the current angular position of the joint 114 corresponds to a predetermined safe angular position of the joint at issue, the microcontroller 124 may power off. However, if the microcontroller 124 determines that the current angular position of the joint 114 does not correspond to a predetermined safe angular position of the joint 114, the microcontroller 124 may take steps to ensure that the angular position of the joint 114 updates to a safe angular position.

Figure 5A:
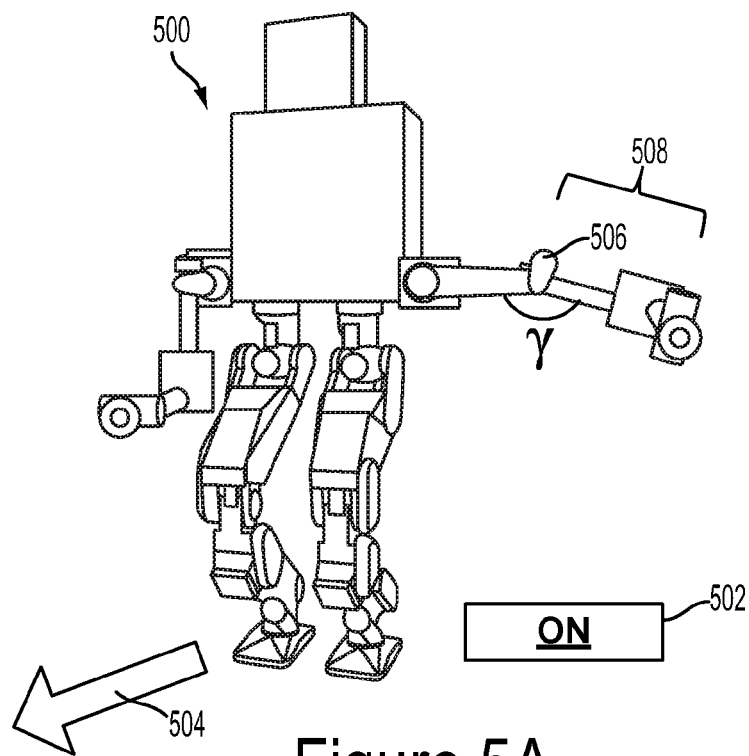
FIGS. 5A-5C illustrate repositioning of a robotic system to a safe position, according to an example implementation.
Figure 5B:
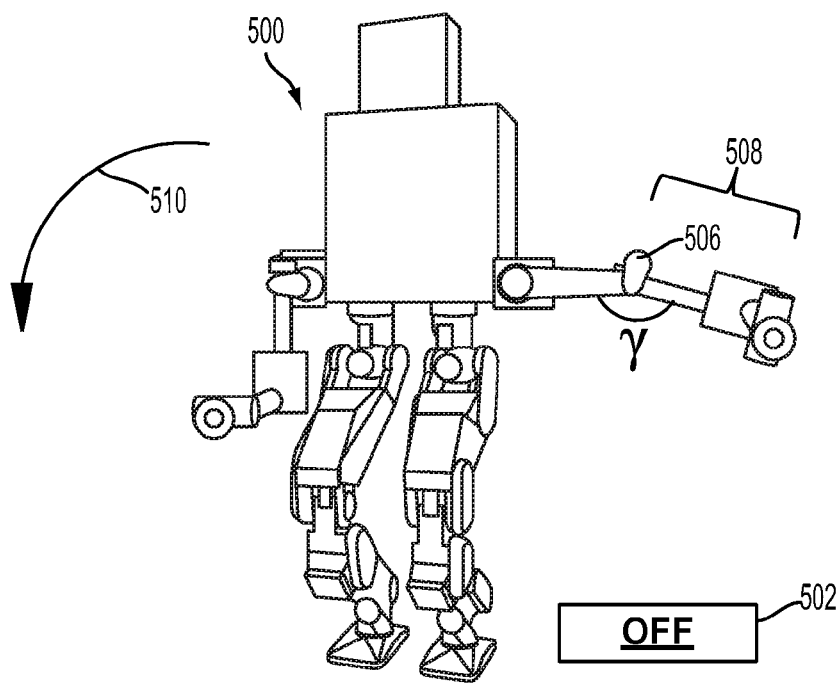

To illustrate, consider FIG. 5A-5B showing example robot 500 that is conceptually illustrated as a humanoid robot. FIG. 5A shows robot 500 powered on (as illustrated by status indicator 502) and moving in direction 504. As the robot 500 moves in direction 504, a link 508 that is connected to joint 506 is positioned such that the angular position of the joint 506 is represented by $\gamma$. Note that robot 500 may include any of the components of robotic system 100 as discussed above (e.g., a regenerative system 120 may be coupled to joint 506).

FIG. 5B illustrates a later point in time where the robot 500 powers off while in motion (i.e., moving in direction 504). Arrow 510 in FIG. 5B illustrates momentum of robot 500, where the robot 500 may tip over and fall to the ground upon powering off (e.g., unintentionally). Upon robot 500 powering off, the microcontroller 124 may determine that the current angular position of the joint 506 (e.g., $\gamma$) does not correspond to a predetermined safe angular position of the joint 506.

In one case, the microcontroller 124 may take steps to cause a motor coupled to joint 506 to move link 508 until output of an incremental encoder coupled to joint 506 indicates a safe angular position of the joint 506. In particular, the regenerative system 120 may be designed to include a regenerative power circuit 122 capable of storing a sufficient amount of electric power to power on a motor. Alternatively, microcontroller 124 may instruct a backup power source to supple power to the motor, among other possibilities. In this case, the microcontroller 124 may determine that the motor is powered off while the robot 500 is powered off and responsively direct the regenerative power circuit 122 to use stored electric power to power on the motor.

In some implementations, the microcontroller 124 may first determine whether the amount of currently stored electric power includes sufficient power to power on the motor. For instance, the motor may require a threshold amount of power and the microcontroller 124 may determine whether the amount of currently stored electric power exceeds the threshold amount of power.

Figure 5C:
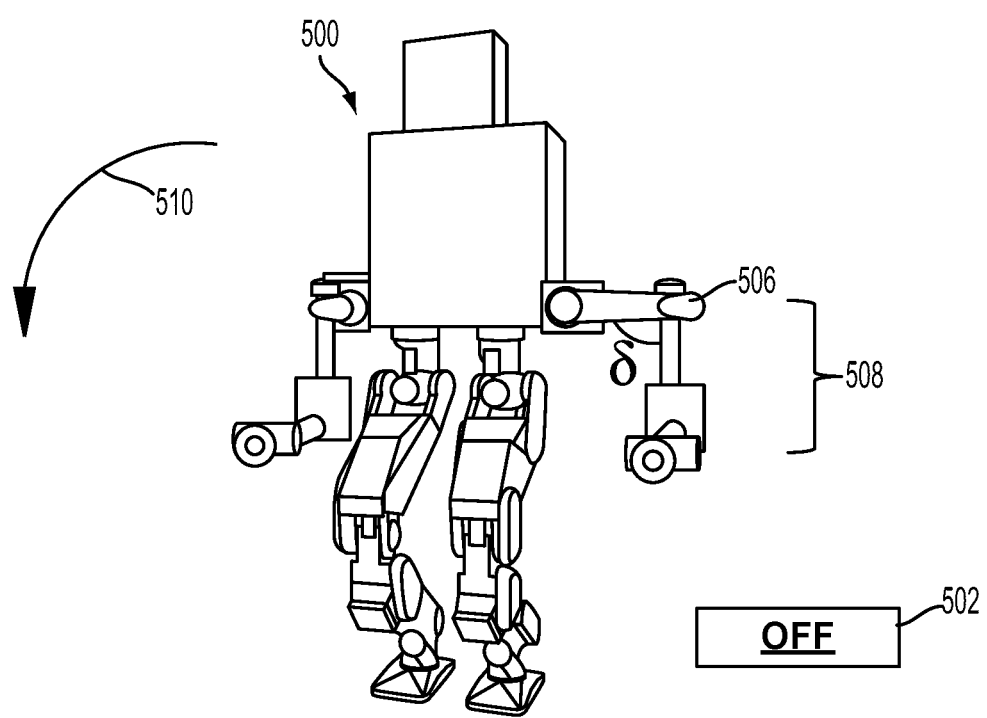

After directing the regenerative power circuit 122 to use stored electric power to power on the motor, the microcontroller 124 may determine that the motor is powered on while the robot 500 is powered off. Upon determining that the motor is powered on while the robot 500 is powered off, the microcontroller 124 may send a command to the motor to cause movement of the link 508 until the microcontroller 124 determines that output of the incremental encoder corresponds to a safe angular position of joint 506. For instance, FIG. 5C illustrates a configuration of robot 500 where the link 508 moved to a position where that output of the incremental encoder corresponds to a safe angular position of joint 506 (e.g., 6). Upon determining that the output of the incremental encoder corresponds to the safe angular position, the motor, the incremental encoder and/or the regenerative system 120 may power off.

In another case, the microcontroller 124 may take steps to cause a braking unit coupled to joint 506 to cause movement of link 508 due to momentum to stop when the output of the incremental encoder coupled to joint 506 indicates a safe angular position of the joint 506. In particular, as mentioned above, movement of a link 508 may be caused by momentum of the link 508 resulting from movement of the link 508 prior to the robot 500 powering off (and thus the motor coupled to joint 506 powering off). As such, the microcontroller 124 may be configured to determine movement of the link 508 as well as determine that movement of the link 508 is caused by such momentum of the link.

For instance, the microcontroller 124 may receive motion data from one or more motion sensors coupled to the joint 506 (and/or the link 508). Such motion sensors may also automatically power on when the robot 500 powers off. As a result, the microcontroller 124 may receive motion data from the motion sensors prior to the robot 500 powering off and subsequent to the robot 500 powering off. Given such motion data, the microcontroller 124 can compare data prior and subsequent to the robot 500 powering off and determine whether the link 508 is moving due to momentum of the link 508 resulting from movement of the link prior to the robot 500 powering off.

Additionally, the microcontroller 124 may use the motion data, such as velocity of the link 508 (as well as possibly other factors such as mass of the link 508), to determine whether the momentum of the link 508 includes sufficient momentum to move the link 508 to a position where the output of the incremental encoder indicates a safe angular position of the joint 506. If the momentum does not include sufficient momentum, the microcontroller 124 may cause the motor to move the link 508 as discussed above. However, if the momentum does include sufficient momentum, the microcontroller 124 may determine a future time when the link 508 will arrive to the position where the output of the incremental encoder indicates the safe angular position of the joint 506.

Subsequently, the microcontroller 124 may send a command to the braking unit to cause movement of the link 508 to stop when the output of the incremental encoder indicates the safe angular position of the joint 506. Such a command may include information related to the future time when the link 508 will arrive to the position as well as information related to the amount of force the braking unit needs to apply in order to stop the link 508 at the position, among other possibilities. In this manner, the braking unit can apply the appropriate amount of force at the appropriate time to stop movement of the link 508.

VI. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent procedures and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and operations of the disclosed implementations with reference to the accompanying figures. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other configurations can include more or less of each element shown in a given figure. Further, some of the illustrated elements can be combined or omitted. Yet further, an example configuration can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A robotic system comprising:
an incremental encoder coupled to a joint of the robotic system, wherein the incremental encoder is configured to provide outputs that indicate positions of the joint;
a memory configured to store information related to a position of the joint;
a motor coupled to the joint, wherein a movement of the joint while the robotic system is powered off causes mechanical motion of the motor, and wherein the mechanical motion of the motor causes the motor to generate electric power; and a regenerative power circuit in communication with the motor, the regenerative power circuit configured to receive the generated electric power from the motor and use the generated electric power, while the robotic system is powered off, to power on the incremental encoder and the memory, the regenerative power circuit having an energy storage component configured to store the generated electric power while unused.

2. The robotic system of claim 1, further comprising:
a processor configured to obtain from the memory, when the robotic system powers on after being powered off, the information related to the position of the joint.

3. The robotic system of claim 1, further comprising:
a microcontroller configured to (i) receive from the incremental encoder, while the robotic system is powered off, information related to the position of the joint and (ii) store in the memory, while the robotic system is powered off, information related to the position of the joint, wherein, while the robotic system is powered off, the generated electric power is also used to power on the microcontroller.

4. The robotic system of claim 3,
wherein the information related to the position of the joint comprises information related to a change of the position of the joint, and wherein the microcontroller being configured to store in the memory the information related to the position of the joint comprises the microcontroller being configured to store in the memory the information related to the change of the position of the joint.

5. The robotic system of claim 3, wherein the incremental encoder being configured to provide outputs that indicate positions of the joint comprises the incremental encoder being configured to provide an output that indicates a change of the position of the joint, and wherein the microcontroller is further configured to:
determine an absolute position of the joint based at least in part on the change of the position of the joint.

6. The robotic system of claim 5, wherein the microcontroller being configured to determine the absolute position comprises the microcontroller being configured to:
determine a most recent position of the joint that is stored in the memory when the robotic system powered off, and
determine the absolute position by adding the change of the position of the joint to the most recent position of the joint.

7. The robotic system of claim 5, wherein the microcontroller being configured to store in the memory information related to the position of the joint comprises the microcontroller being configured to store in the memory information related to the determined absolute position of the joint.

8. The robotic system of claim 3, wherein the microcontroller is further configured to:
determine that the robotic system is powered off;
in response to determining that the robotic system is powered off, instruct the regenerative power circuit to use stored power in the energy storage component to power on the motor; and
while the motor is powered on with the stored power and the robotic system is powered off, send a command to the motor to cause movement of the joint until output of the incremental encoder indicates a safe position of the joint.

9. The robotic system of claim 8, wherein the safe position of the joint is predetermined, and wherein the safe position of the joint is obtained by the microcontroller from the memory.

10. A regenerative system comprising:
a memory configured to store information related to a position of a joint of a robotic system, wherein an incremental encoder is coupled to the joint and provides outputs that indicate positions of the joint, wherein a movement of the joint while the robotic system is powered off causes mechanical motion of a motor coupled to the joint, and wherein the mechanical motion of the motor causes the motor to generate electric power; and
a regenerative power circuit configured to receive the generated electric power from the motor and use the generated electric power to power on the incremental encoder and the memory while the robotic system is powered off, the regenerative power circuit having an energy storage component configured to store the generated electric power while unused.

11. The regenerative system of claim 10, further comprising:
a microcontroller configured to (i) receive from the incremental encoder, while the robotic system is powered off, information related to the position of the joint and (ii) store in the memory, while the robotic system is powered off, information related to the position of the joint.

12. The regenerative system of claim 11,
wherein the position of the joint changed due the movement of the joint while the robotic system was powered off, and
wherein the microcontroller being configured to store in the memory information related to the position of the joint comprises the microcontroller being configured to store in the memory information related to the change of the position of the joint due the movement of the joint while the robotic system was powered off.

13. The regenerative system of claim 11, wherein, while the robotic system is powered off, the generated electric power is also used to power on the microcontroller.

14. A method comprising:
while a robotic system is powered off, powering on, by a regenerative power circuit, (i) an incremental encoder that is coupled to a joint of the robotic system and that is configured to provide outputs that indicate positions of the joint and (ii) a memory configured to store information related to a position of the joint,
wherein a movement of the joint while the robotic system is powered off causes mechanical motion of a motor coupled to the joint,
wherein the mechanical motion of the motor causes the motor to generate electric power, and
wherein the regenerative power circuit uses the generated electric power from the motor to power on the incremental encoder and the memory the regenerative power circuit having an energy storage component configured to store the generated electric power while unused.

15. The method of claim 14,
wherein the regenerative power circuit is part of a regenerative system that also includes a microcontroller,
wherein the microcontroller is configured to receive, from the incremental encoder while the robotic system is powered off and the incremental encoder is powered on, information related to the position of the joint, and
wherein the microcontroller is configured to store, in the memory while the robotic system is powered off and the memory is powered on, information related to the position of the joint.

16. The method of claim 15, wherein, while the robotic system is powered off, the generated electric power is also used to power on the microcontroller.

17. The method of claim 14,
wherein the regenerative power circuit is part of a regenerative system that also includes a microcontroller, and
wherein the microcontroller is configured to transmit, to a processor of the robotic system when the robotic system powers on after being powered off, information related to the position of the joint.

18. The method of claim 17,
wherein the information related to the position of the joint comprises information related to a change of the position of the joint from a first position of the joint to a second position of the joint, and
wherein the microcontroller being configured to transmit information related to the position of the joint the microcontroller being configured to transmit information related to the change of the position of the joint.

19. The method of claim 17,
wherein the memory being configured to store information related to the position of the joint comprises the memory being configured to store information related to an absolute position of the joint, and wherein the microcontroller being configured to transmit information related to the position of the joint the microcontroller being configured to transmit information related to the absolute position of the joint.

* * * * *